United States Patent [19]

Tanaka

[11] Patent Number: 5,793,546
[45] Date of Patent: Aug. 11, 1998

[54] DATA TRANSMITTING APPARATUS AND DATA REPRODUCING APPARATUS USING FORMAT COMPATIBILITY TO ACHIEVE UPWARD AND DOWNWARD COMPATIBILITY

[75] Inventor: Masato Tanaka, Tokyo, Japan

[73] Assignee: Sony Corporation, Tokyo, Japan

[21] Appl. No.: 754,904

[22] Filed: Nov. 22, 1996

Related U.S. Application Data

[63] Continuation of Ser. No. 449,566, May 24, 1995, abandoned, which is a continuation of Ser. No. 7,239, Jan. 21, 1993, abandoned.

[30] Foreign Application Priority Data

Jan. 22, 1992 [JP] Japan .................................. 4-029930

[51] Int. Cl.$^6$ .................................................. G11B 5/02
[52] U.S. Cl. ....................... 360/27; 360/48; 386/131; 386/46
[58] Field of Search ............................. 360/27, 48, 28; 386/35, 46, 108, 131

[56] References Cited

U.S. PATENT DOCUMENTS

| | | | |
|---|---|---|---|
| 4,494,156 | 1/1985 | Kadison et al. | 360/48 |
| 4,507,693 | 3/1985 | Matsuda et al. | 360/72.2 |
| 4,843,485 | 6/1989 | Reitmeier | 360/33.1 X |
| 5,005,171 | 4/1991 | Modisette, Jr. et al. | 370/110.1 |
| 5,075,802 | 12/1991 | Ohashi | 360/27 |
| 5,202,760 | 4/1993 | Tourtier et al. | 358/310 X |
| 5,485,606 | 1/1996 | Midgdey et al. | 395/600 |

FOREIGN PATENT DOCUMENTS

| | | | |
|---|---|---|---|
| 0406188 | 5/1990 | European Pat. Off. | |
| 0421871 | 10/1990 | European Pat. Off. | |
| 01286175 | 11/1989 | Japan | 360/48 |
| 02139771 | 5/1990 | Japan . | |
| 2080997 | 7/1981 | United Kingdom . | |

*Primary Examiner*—Aristotelis M. Psitos
*Assistant Examiner*—Larry T. Cullen
*Attorney, Agent, or Firm*—Jay H. Maioli

[57] ABSTRACT

In a data transmitting/reproducing equipment, e.g., a digital audio tape-recorder, etc., adapted for transmitting data on an information transmission line such as a magnetic tape, etc. where a plurality of formats exist, and reproducing that data through the information transmission line, a scheme is adopted in this invention to guarantee an upgradable format having compatibility in which there are not only so called an upper compatibility but also a lower compatibility with respect to apparatuses already existing. To realize this scheme, on the transmitting or recording side, format ID information indicating a format of transmit data, and a plurality of compatibility ID information indicating compatibility of that format relative to other formats are generated and added to the transmit data, thus to transmit the transmit data on the information transmission line along with the format ID information and the compatibility ID information added thereto. On the receiving or reproducing side, transmit data transmitted through the information transmission line from the transmitting side is reproduced in accordance with the compatibility ID information.

4 Claims, 9 Drawing Sheets

| WORD \ BITS | D11 | D10 | ... | D1 | D0 |
|---|---|---|---|---|---|
| $CW_1$ | FORMAT ID | | | COMPATIBLITY ID | |
| $CW_2$ | LEVEL METER INFORMATION ||||| 
| $CW_3$ | AMS FLAG BINARY ADDRESS ||||| 
| $CW_4$ | DATA/TIME INFORMATION ||||| 
| $CW_5$ | PACK AREA 0 ||||| 
| $CW_6$ | PACK AREA 1 ||||| 
| $CW_{19}$ | PACK AREA 12 ||||| 
| $CW_{20}$ | PACK AREA 13 |||||

FIG.6

| BIT | D11 | D10 | D9 | D8 | D7 | D6 | D5 | D4 | D3 | D2 | D1 | D0 |
|---|---|---|---|---|---|---|---|---|---|---|---|---|
| PAGE 00,01 | SCMS || EMPHASIS || SELF FORMAT ID<br>MODE ID \| VERSION ID ||||||||
| PAGE 02,03 | REVERSE FRAG || IDLE || EXTENDED FORMAT ID ||||||||
| PAGE 04~27 | ID FLAG || IDLE || COMPATIBILITY ID<br>MODE ID \| VERSION ID ||||||||
| PAGE 28,29 | SECRET CODE ||||||||||||
| PAGE 30,31 | SECRET CODE ||||||||||||

FIG.7

| BIT | D11 | D10 | D9 | D8 | D7 | D6 | D5 | D4 | D3 | D2 | D1 | D0 |
|---|---|---|---|---|---|---|---|---|---|---|---|---|
| PAGE 00,01 | AMS FLAG | | | | PLAYING TIME INFORMATION 10MIN. | | | | PLAYING TIME INFORMATION 1MIN. | | | |
| PAGE 02,03 | BINARY ADDRESS | | | | | | | | | | | |
| PAGE 04,05 | AMS FLAG | | | | PLAYING TIME INFORMATION 10SEC. | | | | PLAYING TIME INFORMATION 1SEC. | | | |
| PAGE 06,07 | BINARY ADDRESS | | | | | | | | | | | |
| PAGE 08,09 | AMS FLAG | | | | INDEX TIME INFORMATION 10MIN. | | | | INDEX TIME INFORMATION 1MIN. | | | |
| PAGE 10,11 | BINARY ADDRESS | | | | | | | | | | | |
| PAGE 12,13 | AMS FLAG | | | | INDEX TIME INFORMATION 10SEC. | | | | INDEX TIME INFORMATION 1SEC. | | | |
| PAGE 14,15 | BINARY ADDRESS | | | | | | | | | | | |

FIG.8

| BIT | D11 | D10 | D9 | D8 | D7 | D6 | D5 | D4 | D3 | D2 | D1 | D0 |
|---|---|---|---|---|---|---|---|---|---|---|---|---|
| PAGE 00,01 | 1/100MIN. | | | | | RECORDING DATE INFORMATION 0 10YEARS | | | | | | 1YEAR |
| PAGE 02,03 | 1/10MIN. | | | | | RECORDING DATE INFORMATION 1 10MONTHS | | | | | | 1MONTH |
| PAGE 04,05 | 1/100MIN. | | | | | RECORDING DATE INFORMATION 2 10DAYS | | | | | | 1DAY |
| PAGE 06,07 | 1/10MIN. | | | | | RECORDING DATE INFORMATION 3 | | | | | | DAY OF WEEK |
| PAGE 08,09 | 1/100MIN. | | | | | RECORDING DATE INFORMATION 0 10TIMES | | | | | | 1TIME |
| PAGE 10,11 | 1/10MIN. | | | | | RECORDING DATE INFORMATION 1 10MIN. | | | | | | 1MIN. |
| PAGE 12,13 | 1/100MIN. | | | | | RECORDING DATE INFORMATION 2 10SEC. | | | | | | 1SEC. |
| PAGE 14,15 | 1/10MIN. | | | | | | | | | | | |

FIG.9

DATA TRANSMITTING APPARATUS AND DATA REPRODUCING APPARATUS USING FORMAT COMPATIBILITY TO ACHIEVE UPWARD AND DOWNWARD COMPATIBILITY

This is a continuation of application Ser. No. 08/449,566 filed May 24, 1995, which is a continuation of Ser. No. 08/007,239 filed Jan. 21, 1993, both of which have been abandoned.

BACKGROUND OF THE INVENTION

1. Field of the Invention

This invention relates to a data transmitting apparatus adapted for transmitting transmit format information on an information transmission line where a plurality of formats exist, and a data reproducing apparatus adapted for reproducing data transmitted through the information transmission line by the data transmitting apparatus. For example, this invention can be applied to a digital information recording/reproducing apparatus adapted for carrying out recording/reproduction of digital data through a recording medium such as a magnetic tape or a magneto-optical disk, etc.

2. Description of the Prior Art

For data transmitting apparatuses such as a recording/reproducing apparatus adapted for carrying out recording/reproduction of signals on/from a recording medium such as a magnetic tape or a magneto-optical disk, etc., reproduction processing corresponding to a format of data transmitted through the information transmission line from the data transmitting (recording) side is carried out on the data receiving (reproducing) side to thereby reproduce that data.

Generally, where models of an extended format are developed later with respect to models of a fundamental or standard format. For example, in a video tape-recorder adapted for recording/reproducing video signals on/from a magnetic tape, up-grade formats such as a long time recording mode or a broad band recording mode supplement the standard format.

With an apparatus using exclusively the standard format at that time, it was conventionally impossible to reproduce video signals recorded on a magnetic tape in accordance with those later-developed up-grade formats. However, in models corresponding to those later-developed up-grade formats, measures to cope with a plurality of formats, which are called upper compatibility, have been taken so as to permit former-developed formats as well to be reproduced.

The above-mentioned formats are all directed toward analog signals. On the other hand, for digital information, there exist a plurality of formats such that a common system is generally used for the modulation system and the error detecting system, but only respective data forms are different. For example, there are a standard mode and a Long Play (LP) mode for a Digital Audio Tape-recorder (DAT).

In these digital formats, format ID information is generally recorded so that a reproducing apparatus can discriminate between formats. A processing of reproduced signals is adjusted depending upon such format ID information. However, a reproducing apparatus which recognizes that it cannot process a particular format applies muting to a reproduced output to thereby prevent occurrence of sound of large level from erroneous data processing. In this way, a measure is taken to prevent an undesirable result such as a listener being suddenly surprised by a large level noise, or a speaker particularly a tweeter for a high-pitched tone being broken, etc. In addition, there are instances where an alarm indication such as a format error is generated.

Meanwhile, in the case of the above-described format ID information, a scheme has been employed to store only ID information of a format available at the time when that apparatus is manufactured. For this reason, there was the inconvenience that formats newly developed afterwards are not available for the apparatus concerned.

Further, in the case of G3 standard in a facsimile communication system, etc., there is a system of carrying out exchange of format information between an apparatus at one end and an apparatus at the other end to determine the best format which is available commonly such that the two apparatuses can carry out communication with accordance with that format. However, in information transmission lines for transmitting information in one format, such as recording media or a broadcasting media, it is impossible to carry out two-way exchange of format information between the transmitting side and the reproducing or receiving side. For this reason, such a method as employed in the case of a facsimile cannot be adopted.

OBJECT AND SUMMARY OF THE INVENTION

In view of the problems from transmitting information in one format with conventional information transmission lines for transmitting information in one direction only, such as, recording media or broadcasting media as described above, with a view to ensuring an up-grade format having compatibility in which there are not only so called an upper or upward compatibility but also a lower or downward compatibility with respect to apparatuses already existing, this invention contemplates providing a data transmitting apparatus adapted for transmitting data on an information transmission line where a plurality of formats exist along with format ID information and compatibility ID information, and a data reproducing apparatus adapted for reproducing data transmitted through the information transmission line from the data transmitting apparatus.

As a first aspect of this invention, there is provided a data transmitting apparatus for transmitting data on an information transmission line where a plurality of formats exist, the data transmitting apparatus comprising: ID information generating means for generating format ID information indicating a format of the transmit data, and compatibility ID information indicating compatibility of the format relative to other formats; ID information adding means for adding the format ID information and the compatibility ID information to the transmit data; and transmitting means for transmitting the transmit data on said information transmission line along with the format ID information and the compatibility ID information added thereto.

The ID information generating means may generate a plurality of compatibility ID information which are compatible with the format ID information of the transmit data.

In this case, the ID information generating means may generate the plural compatibility ID information from high grade version to low grade version in order.

As a second aspect of this invention, there is provided a data transmitting and reproducing apparatus for transmitting and reproducing transmit data on an information transmission line where a plurality of formats exist, the data transmitting and reproducing apparatus comprising: ID information generating means for generating format ID information indicating a format of the transmit data and plural compatibility ID information indicating compatibility of the format relative to other formats; ID information adding means for adding the format ID information and the compatibility ID information to the transmit data; transmitting means for transmitting the transmit data on the information transmission line along with the format ID information and the compatibility ID information added thereto; and reproducing means adapted to receive the transmit data transmitted through the information transmission line along with the format ID information and the compatibility ID information added thereto to reproduce the transmit data in accordance with one of the compatibility ID information.

As a third aspect of this invention, there is provided a data reproducing apparatus adapted to receive transmit data, format ID information indicating a format of the transmit data, and a plurality of compatibility ID information indicating compatibility of the format to other formats which are transmitted through an information transmission line where a plurality of formats exist, thus to reproduce the transmit data in accordance with one of the compatibility ID information.

In this case, one of the compatibility ID information may indicate the highest grade format among the plural compatibility ID information transmitted through the information transmission line.

In accordance with the first aspect of the invention, in a data transmitting apparatus adapted for transmitting data on an information transmission line where a plurality of formats exist, an approach is employed to generate, by using ID information generating means, format ID information indicating a format of transmit data and compatibility ID information indicating compatibility of that format relative to other formats, to add or supplement the format ID information and the compatibility ID information, to transmit data by using ID information adding means, thus to transmit the transmit data on the information transmission line along with the format ID information and the compatibility ID information added thereto. Moreover, in accordance with the information transmitting apparatus of this aspect, the ID information generating means generates a plurality of compatibility ID information which are compatible with the format ID information of transmit data. In this case, the ID information generating means may be constructed to generate the plural compatibility ID information from high grade version to low grade version in order.

In accordance with the second aspect of the invention, as readily seen from the above-mentioned feature corresponding thereto, the definition of a data transmitting and reproducing apparatus expands the concept of the first aspect to a transmitting/reproducing system, wherein the reproducing means receives the transmit data, along with the format ID information and the compatibility ID information added thereto, transmitted through the information transmission line from the data transmitting apparatus presented as the first aspect, and to reproduce the transmit data in accordance with the compatibility ID information.

In addition, in accordance with the third aspect of the invention, the data reproducing apparatus receives transmit data, format ID information indicating a format of the transmit data, and a plurality of compatibility ID information indicating compatibility of the format to other formats which are transmitted through an information transmission line where a plurality of formats exist, and to reproduce the transmit data in accordance with one of the compatibility ID information. In this case, the compatibility ID information is determined for the highest grade format among the plural compatibility ID information transmitted through the information transmission line.

BRIEF DESCRIPTION OF THE DRAWINGS

FIG. 6 is a view showing, in a model form, the content of CTL data assigned to the above-mentioned CTL block interval.

FIG. 7 is a view showing, in a model form, the content of page allocation of the first word of the above-mentioned CTL data.

FIG. 8 is a view showing, in a model form, the content of page allocation of the third word of the above-mentioned CTL data.

FIG. 9 is a view showing, in a model form, the content of page allocation of the fourth word of the above-mentioned CTL data.

DESCRIPTION OF THE PREFERRED EMBODIMENT

An embodiment of a data transmitting apparatus and a data reproducing apparatus according to this invention will now be described in detail with reference to the attached drawings.

In the embodiment shown in FIGS. 1 to 10, this invention is applied to a rotary head type digital tape-recorder.

Figure 1:
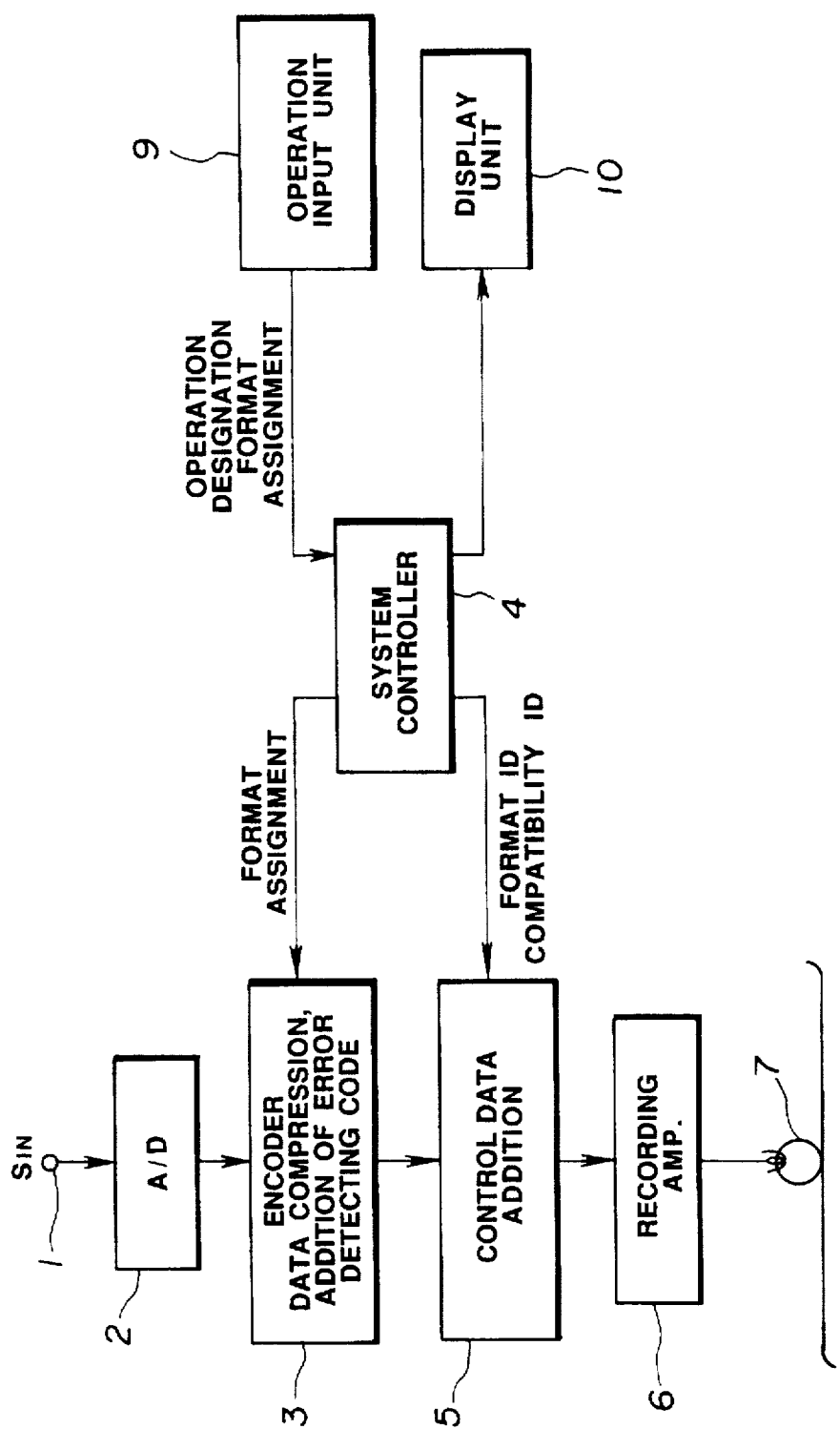
FIG. 1 is a block diagram showing a basic configuration of a recording system of a digital tape-recorder to which this invention is applied.

FIG. 1 is a block diagram showing the basic configuration of a recording system of this digital tape-recorder. In FIG. 1, an input audio signal SIN inputted through a signal input terminal 1 is digitized by an A/D converter 2, and is then delivered to an encoder 3.

The encoder 3 carries out an encode processing such as compression processing or interleaving processing of data, or adding processing of an error detecting code (EDC) in accordance with a predetermined format assigned by a system controller 4 with respect to the digital audio signal delivered from the A/D converter 2. The digital audio signal to which the encode processing is implemented by the encoder 3 is delivered to a control data adding unit 5.

The control data adding unit 5 adds, along with other control information, format ID information and compatibility ID information given by the system controller 4 to a control (CTL) block portion of the digital audio signal delivered from the encoder 3. The digital audio signal to which various control information are added by the control data adding unit 5 is delivered to a rotary magnetic head 7 through a recording amplifier 6, and is recorded onto a slant recording track of a magnetic tape 8 by the rotary magnetic head 7.

The system controller 4 is adapted to carry out an operation control of the recording system in accordance with a specified operation input or a specified format input by an operation of an operation input unit 9. Namely, the system controller 4 carries out assignment of a recording format of a digital audio signal at the encoder 3, and to give, to the control data adding unit 5, format ID information indicating the recording format and compatibility ID information indicating compatibility of that recording format relative to other recording formats. In addition, the system controller 4 also carries out a display control to allow a display unit 10 to display an operational mode, etc. thereon.

It is to be noted that the system controller 4 may give the compatibility ID information to the control data adding unit 5 in order of priority of compatibility of the recording format relative to other plural recording formats.

Namely, in the recording system of this digital tape-recorder, an approach is employed to give, to the control data adding unit 5, by using the system controller 4, format ID information indicating a recording format of a digital audio signal and compatibility ID information indicating compatibility of that recording format relative to other recording formats, thus to record the format ID information and the compatibility ID information onto the magnetic tape 8 along with the digital audio signal.

Figure 2:
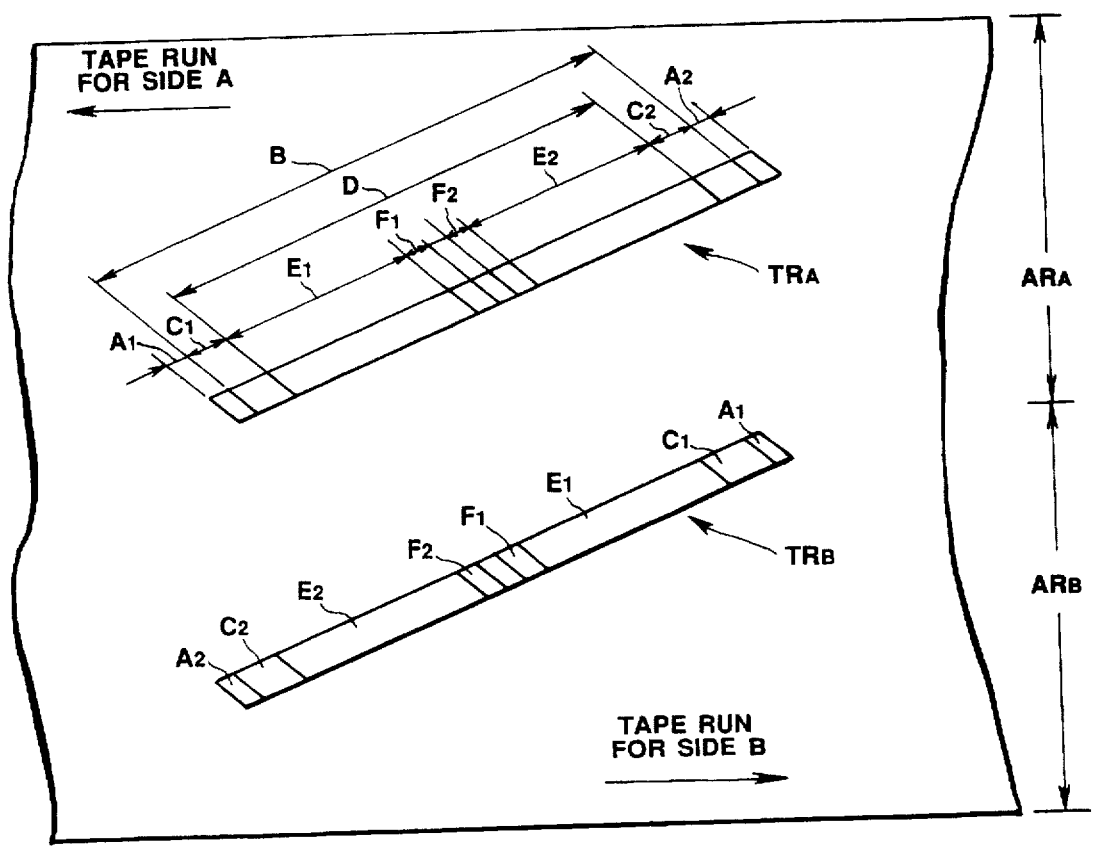
FIG. 2 is a view showing, in a model form, a tape format in the above-mentioned digital tape-recorder.

In this digital tape-recorder, as the tape format thereof is shown in FIG. 2, the recording area of the magnetic tape is divided, in a tape width direction, into a side A recording area $AR_A$ scanned by rotary magnetic heads at the time of tape run for side A and a side B recording area $AR_B$ scanned by the rotary magnetic heads at the time of the tape run for side B. Recording/reproducing of a digital audio signal is carried out through a slant recording track $TR_A$ in the side A recording area $AR_A$ and a slant recording track $TR_B$ in the side B recording area $AR_B$. On the both sides of respective slant recording tracks $TR_A$, $TR_B$, invalid overwriting intervals $A_1$, $A_2$ are respectively provided. Further, valid overwriting intervals $C_1$, $C_2$ are respectively provided on the both end sides of the remaining valid track interval B. In addition, data block intervals $E_1$, $E_2$, and CTL block intervals $F_1$, $F_2$ are provided in the remaining mandatory block interval D.

Figure 3:
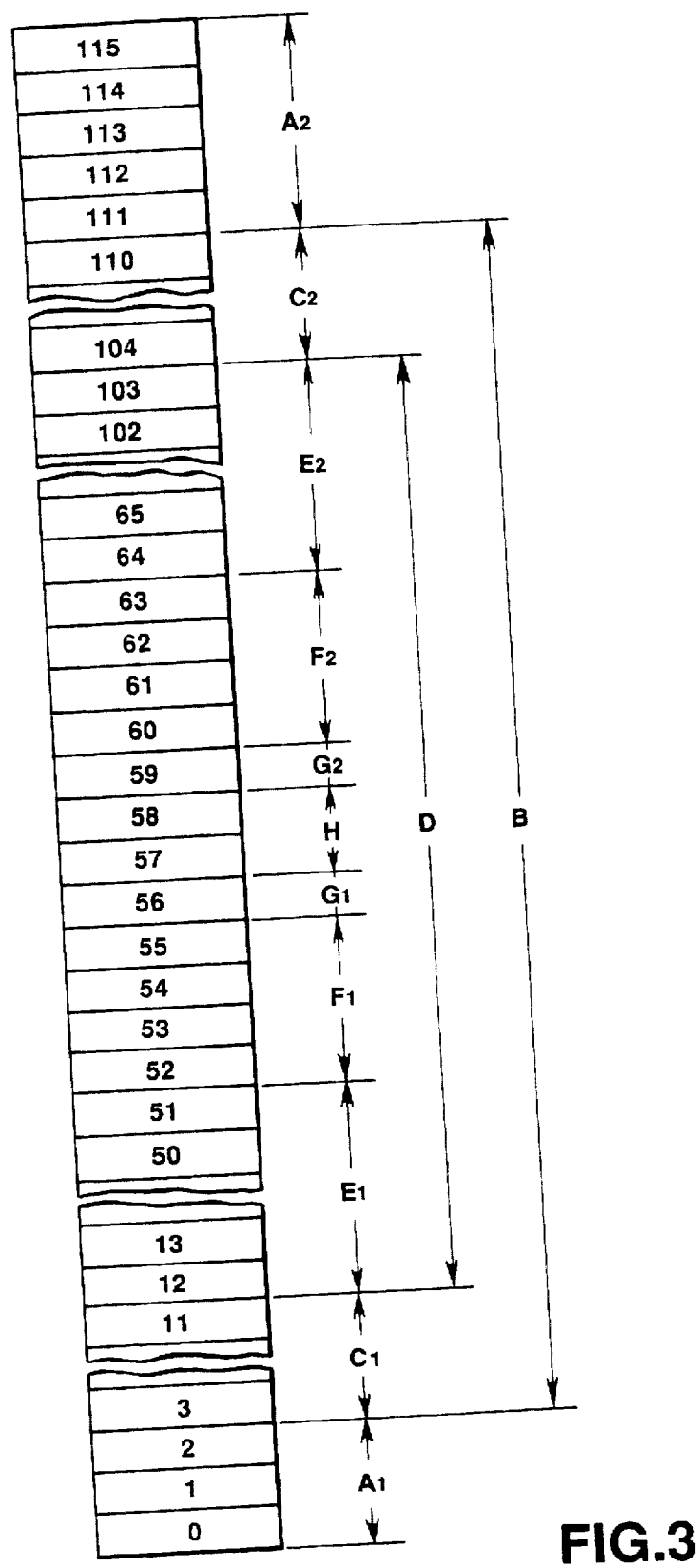
FIG. 3 is a view showing, in a model form, the configuration of data of one slant recording track in the above-mentioned tape format.

As shown in FIG. 3, data of one slant recording track corresponds to 116 data blocks (block Nos. 0~115). As invalid overwriting intervals $A_1$, $A_2$ at the both end portions thereof, three blocks (block Nos. 0~2) are assigned to the inside invalid overwriting interval $A_1$, and five blocks (block Nos. 111~115) are assigned to the outside invalid overwriting interval $A_2$. In addition, the remaining 108 blocks (block Nos. 3~110) correspond to the valid track interval B.

Further, as valid overwriting intervals $C_1$, $C_2$ at the both end portions of the valid track interval B, 9 blocks (block Nos. 3~11) are assigned to the inside valid overwriting interval $C_1$, and 7 blocks (block Nos. 104~110) are assigned to the outside valid overwriting interval $C_2$. In addition, the remaining 92 blocks (block Nos. 12~103) correspond to the mandatory block interval D.

In addition, 40 blocks (block Nos. 12~1, block Nos. 64~103) on the both sides of the mandatory block interval D are respectively assigned to data block intervals $E_1$, $E_2$; 4 blocks (block Nos. 52~55, block Nos. 60~63) on the inside of the mandatory block interval D are respectively assigned to CTL block intervals $F_1$, $F_2$; and central two blocks (block Nos. 57, 58) are assigned to an AUX (auxiliary) block interval H. It is to be noted that two blocks of the block No. 56 and the block No. 59 are used as invalid intervals $G_1$, $G_2$, for separating the AUX block interval H and the CTL block intervals $F_1$, $F_2$.

Data and parity of the inside invalid overwriting interval $A_1$ (block Nos. 0~2) and the inside valid overwriting interval $C_1$ (block Nos. 3~11) repeat exactly the same contents as those of the block No. 93~103 of the data block interval $E_2$. Moreover, data and parity of the outside valid overwriting interval $C_2$ (block Nos. 104~110) and the outside invalid overwriting interval $A_2$ (block Nos. 111~115) repeat exactly the same contents as those of the block Nos. 12~23 of the data block interval $E_1$.

Figure 4:
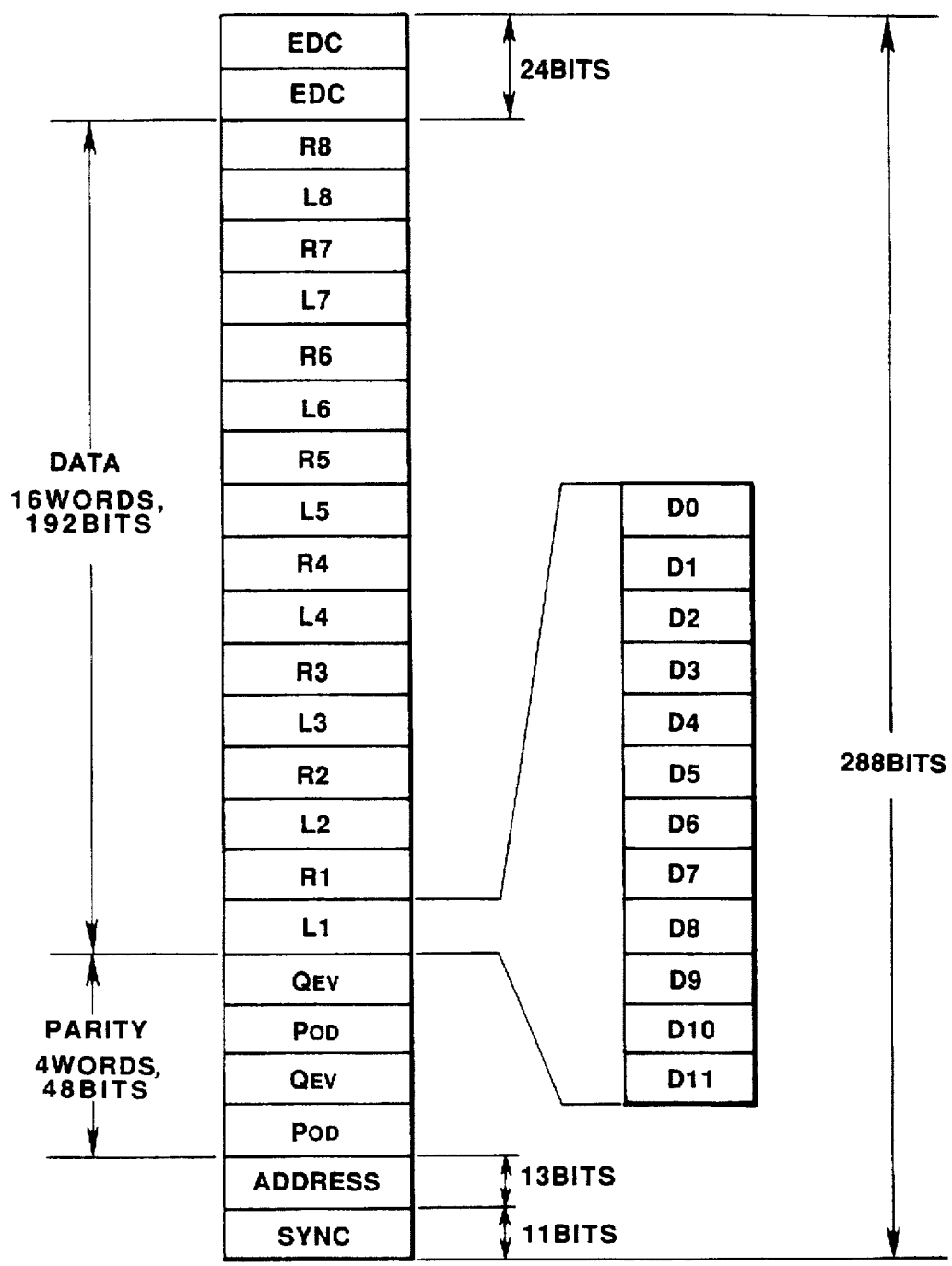
FIG. 4 is a view showing, in a model form, the configuration of one block of data on the above-mentioned slant recording track.

Further, one block is comprised of 288 bits as shown in FIG. 4 wherein the first 11 bits are assigned to a synchronizing signal, 13 bits subsequent thereto are assigned to an address signal, 48 bits (4 words) subsequent thereto are assigned to parity, 192 bits (16 words) subsequent thereto are assigned to data, and the last 24 bits are assigned to an error detecting code (EDC). The address signal of 13 bits is comprised of a track address of 6 bits and a block address of 7 bits. Further, the track address is incremented by one every two fields (tracks). In addition, data of one word is comprised of 12 bit data $D_{11}$~$D_0$ of MSB first.

Figure 5:
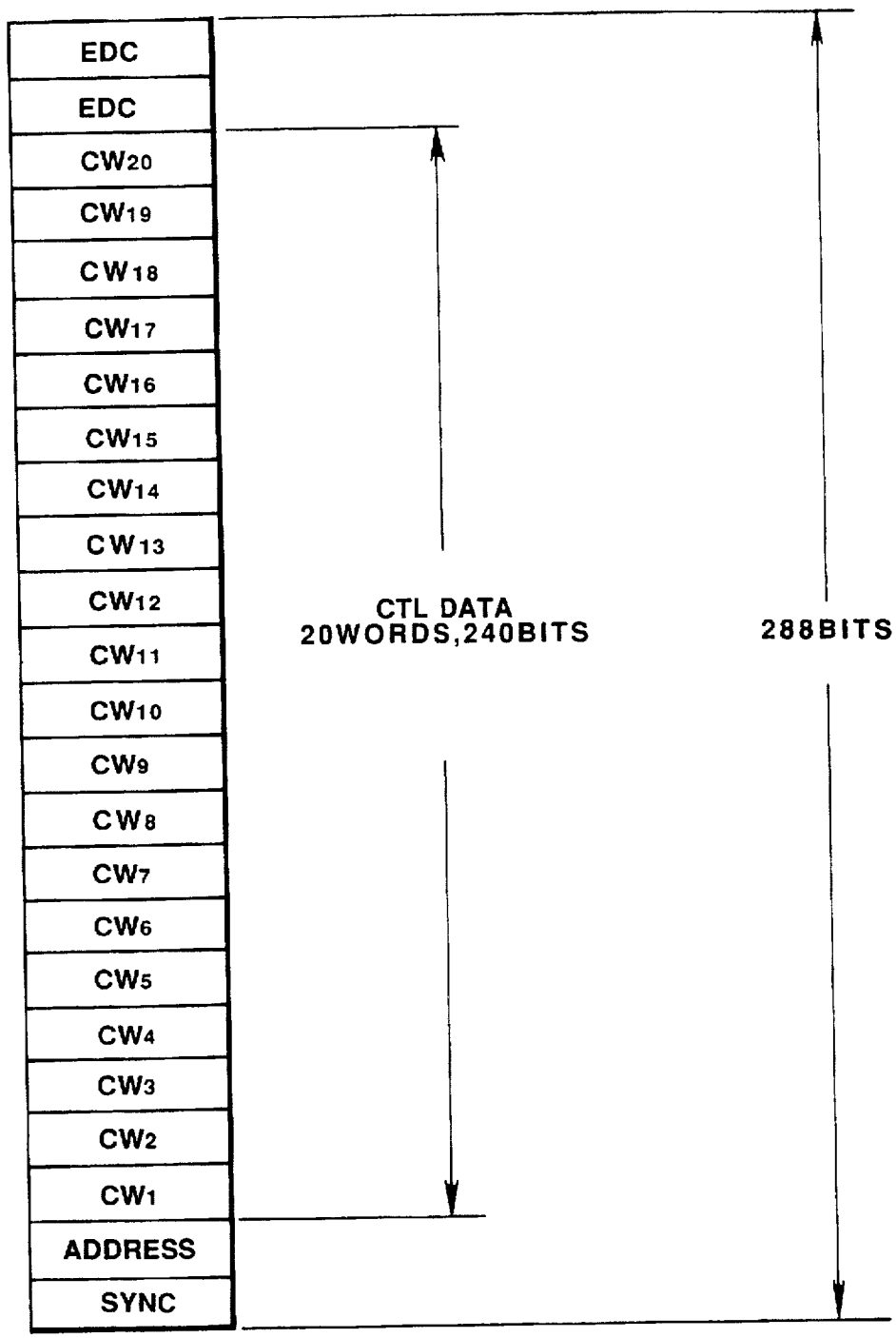
FIG. 5 is a view showing, in a model form, the configuration of data in a CTL block interval of a slant recording track in the above-mentioned tape format.

Furthermore, in the CTL block interval $F_1$, as shown in FIG. 5, a parity portion of 48 bits (4 words) is also assigned to data, and 240 bits are assigned to CTL data of 20 words $CW_1$~$CW_{20}$. The content of the CTL data of 20 words $CW_1$~$CW_{20}$ is as shown in FIG. 6. Namely, format ID information and compatibility ID information are assigned to the first word $CW_1$; level meter information is assigned to the second word $CW_2$; an AMS flag and a binary address are assigned to the third word $CW_3$; date/time information is assigned to the fourth word $CW_4$; and other fifth word $CW_5$~twentieth words $CW_{20}$ serve as a pack area.

The CTL block interval $F_1$ defines a page incrementing by one every track and cyclically changing at a period of $2^n$. Pages are independently attached every respective words. For example, a channel A where track addresses are all "0" corresponds to a page 00.

In the first word $CW_1$, as shown in FIG. 7, various information are recorded over 32 pages.

Namely, on the page 00 and the page 01, SCMS (Serial Copy Management System) information of 2 bits indicating whether or not copying is permissible, control information of 2 bits indicating an emphasis state, and self-format ID information of 8 bits comprised of mode ID information of 4 bits indicating a format of a recorded digital audio signal and version ID information of 4 bits are recorded.

The above-mentioned self-format ID information is format ID information indicating the above-described recording format for digital audio signal. As this self-format ID information, in the case of equipment of the standard model, mode ID information $[1]_H$ indicating a mode for handling digital audio signals of 2 channels and version ID information $[1]_H$ indicating a standard version where the sampling frequency is 32 KHz are given.

As the mode ID information, mode ID information $[2]_H$ indicating a mode for handling digital audio signals of 4 channels, mode ID information $[8]_H$ indicating a mode where an equipment is used as a data recorder, and the like are defined. Further, as the version ID information, version ID information $[2]_H$ indicating an improved version of the standard version where the sampling frequency fs is 32 kHz, version ID information $[3]_H$ indicating an improved version of the standard version where the sampling frequency fs is 48 kHz, version ID information $[4]_H$ indicating a high grade version where the sampling frequency fs is 48 KHz, and the like are defined.

Further, on the page 02 and the page 03, a reverse flag of 2 bits and extended format ID information of 10 bits are recorded.

In addition, on the pages 04–027, an ID flag of 1 bit and compatibility ID information of 8 bits are recorded.

The compatibility ID information is comprised of the mode ID information of 4 bits and the version ID information of 4 bits described above, and is such that combinations of mode ID information and version ID information which are compatible with each other in reproduction are arranged. The same combinations are recorded by two pages. Further, the compatibility ID information are written as follows. Namely, compatibility ID information having reproduction compatibility are written from the pages 04, 05 toward a greater page No. in order of preferential property (reproduction desirous rank). ID flags (D11) of the last two pages are set to zero (0), and ID flags (D11) preceding thereto are all set to zero (0) until the page 04. Thus, a scheme is employed such that information of pages subsequent to the page where the ID flag (D11) is zero are not considered as compatibility ID information. Further, in the case where there is no combination of mode ID information and version ID information which are compatible with each other in reproduction except for the self format, 12 bits of the pages 04, 05 are all set to zero (0).

Further, on the pages 28–3, secret codes of 24 bits are recorded.

In the second word $CW_2$, level meter information obtained by sampling digital audio signals of 2 channels at the same time once two fields are recorded every four fields, i.e., at the repetition of 4 pages.

Further, as shown in FIG. 8, an AMS (Automatic Music Sensor) flag and a binary address, etc. are recorded into the third word $CW_3$ at the repetition of 16 pages.

Namely, an AMS flag of 4 bits and playing time information of 10 bits are recorded onto the pages 00 and 01. A binary address of 12 bits is recorded onto the pages 02 and 03. An AMS flag of 4 bits and playing time information of 10 bits are recorded onto the pages 04 and 05. A binary address of 12 bits is recorded onto the pages 06 and 07. An AMS flag of 4 bits and index time information of 10 bits are recorded onto the pages 08 and 09. A binary address of 12 bits is recorded onto the pages 10 and 11. An AMS flag of 4 bits and index time information of 10 bits are recorded onto the pages 12 and 13. In addition, a binary address of 12 bits is recorded onto the pages 14 and 15.

The above-mentioned playing time information is indicated by the complement BCD from 00 min. 00 sec to 99 min. 99 sec. Playing time information every ten minutes and every one minutes are recorded onto the pages 00 and 01. Playing time information every ten seconds and every second are recorded onto the pages 04 and 05. Similarly, the index time information is indicated by the complement BCD from 00 min. 00 sec. to 99 min. 99 sec. Index time information every ten minutes and every minute are recorded onto the pages 08 and 09. Index time information every ten seconds and every second are recorded onto the pages 12 and 13. In addition, the binary address is recorded by one's complement of natural binary number incrementing by one every 128 tracks.

Further, date/time information is recorded at the repetition of 16 pages, as shown in FIG. 9, into the fourth word $CW_4$.

Namely, data every 1/100 minutes of 4 bits and recording date information 0 of 8 bits are recorded onto the pages 00 and 01. The recording date information 0 is comprised of data every ten years of 4 bits and data every year of 4 bits. Data every 1/10 minutes of 4 bits and recording date information 1 of 8 bits are recorded onto the pages 02 and 03. The recording date information 1 is comprised of data every ten months of 4 bits and data every month of 4 bits. Data every 1/100 minutes of 4 bits and recording date information 2 of 8 bits are recorded onto the pages 04 and 05. The recording date information 2 is comprised of data every ten days of 4 bits and data every day of 4 bits. Data every 1/10 minutes of 4 bits and recording date information 3 of 8 bits are recorded onto the pages 06 and 07. The recording data information 3 is such that use of higher order 4 bits is inhibited, and the higher order 4 bits are data of day of the week. Data every 1/100 minutes of 4 bits and recording time information 0 of 8 bits are recorded onto the pages 08 and 09. The recording time information 0 is comprised of data every 10 hours of 4 bits and data every hour of 4 bits. Data every 1/10 minutes of 4 bits and recording time information 1 of 8 bits are recorded onto the pages 10 and 11. The recording time information 1 is comprised of data every 10 minutes of 4 bits and data every minute of 4 bits. Data every 1/100 minutes of 4 bits and recording time information 2 of 8 bits are recorded onto the pages 12 and 13. The recording time information 2 is comprised of data every 10 seconds of 4 bits and data every second of 4 bits. On the pages 14 and 15, lower order 8 bits are in an undefined state, and data every 1/10 minutes is recorded into an area of higher order 4 bits.

Figure 10:
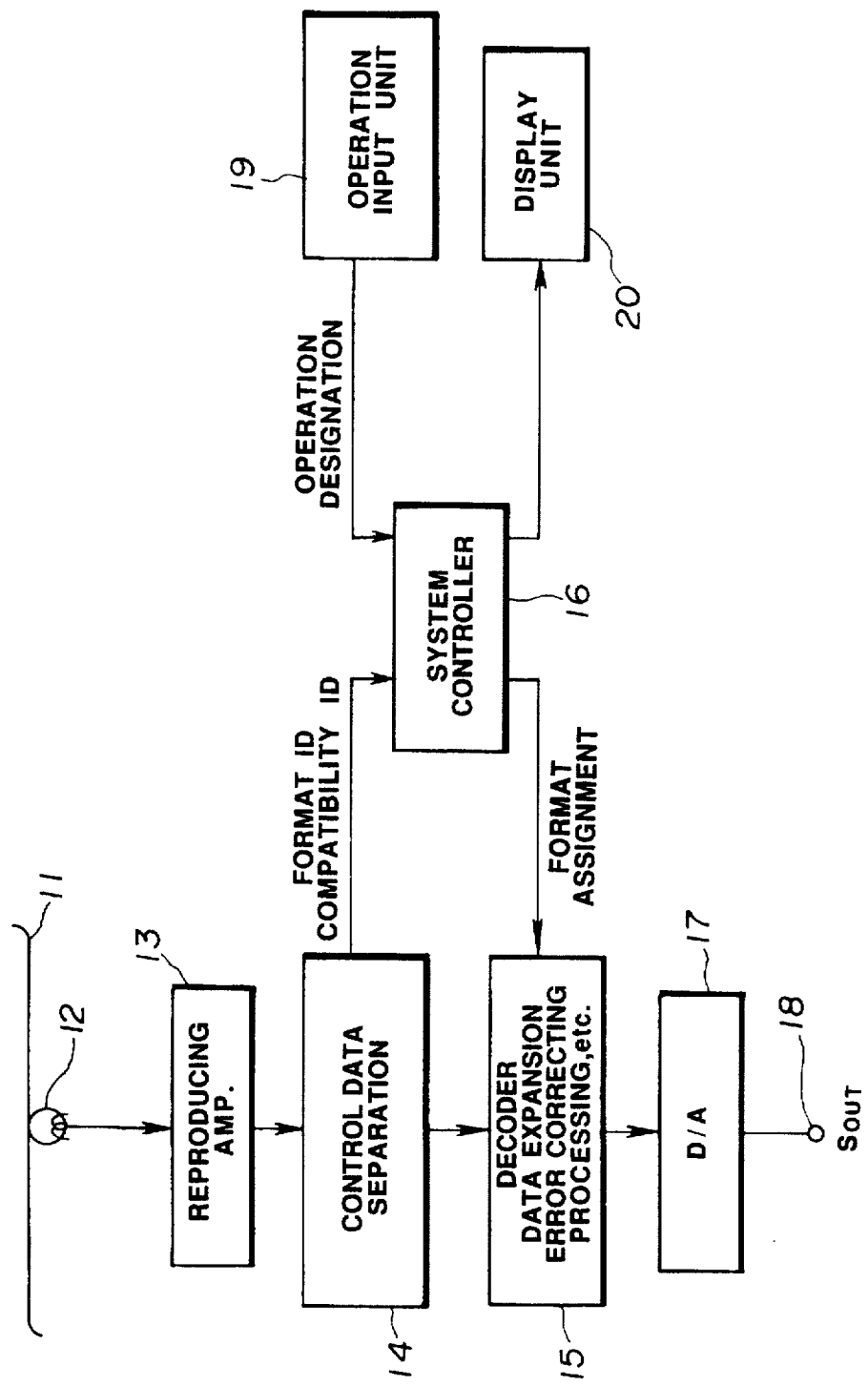
FIG. 10 is a block diagram showing a basic configuration of a reproducing system of a digital tape-recorder to which this invention is applied.

FIG. 10 is a block diagram showing a basic configuration of the reproducing system of this digital tape-recorder. In FIG. 10, a reproduced signal obtained by a rotary magnetic head 12 from a recorded magnetic tape 11 is delivered to a control data separation circuit 14 through a reproducing amplifier 13.

The control data separation circuit 14 separates the reproduced signal delivered from the reproducing amplifier 13 into a digital audio signal and control information such as format ID information and compatibility ID information, etc. The digital audio signal obtained by the control data separation circuit 14 is delivered to a decoder 15, and the control information such as format ID information and compatibility ID information, etc. are delivered to a system controller 16.

The decoder 15 carries out decode processing such as error correction processing, deinterleaving processing, or expanding processing, etc. of data in accordance with a predetermined format assigned by the system controller 16. The digital audio signal to which decode processing is implemented by the decoder 15 is converted to a corresponding analog signal by a D/A converter 17. The analog signal thus obtained is outputted as a reproduced audio signal $S_{OUT}$ from a signal output terminal 18.

The system controller 16 serves to carry out an operation control of the reproducing system in accordance with a specified operation input by an operation of an operation input unit 19, or control information from the control data separation circuit 14. Namely, when a reproducing operation is specified or designated by operation of the operation input unit 19, the system controller 16 carries out assignment of a reproduction format of a digital audio signal at the decoder 15 on the basis of control information such as the format ID information or the compatibility ID information, etc. Namely, if a recording format indicated by the format ID information is available for this reproducing system, the system controller 16 carries out assignment of format at the decoder 15 so as to carry out a decode processing corresponding to the recording format.

On the contrary, if a recording format indicated by the format ID information is not available for this reproducing system, the system controller 16 judges whether or not the recording format indicated by the compatibility ID information is available for the reproducing system to carry out assignment of format at the decoder 15 so as to carry out a decode processing in accordance with a format available for the reproducing system.

In the case where a plurality of recording formats indicated by the compatibility ID information are available for the reproducing system, the system controller 16 carries out assignment of format at the decoder 15 so as to carry out a decode processing by a format highest in performance of those formats. It is to be noted that an approach may be employed such that in the case where compatibility ID information are given in order of priority of compatibility, the system controller 16 carries out assignment of format at the decoder 15 so as to carry out a decode processing in accordance with a format of the highest grade of a plurality of recording formats available for the reproducing system.

Further, the system controller 16 also carries out a display control to allow a display unit 20 to display an operational mode thereon, or the like. If both the recording format indicated by the format ID information and recording format indicated by the compatibility ID information are not available for the reproducing system, the system controller 16 applies muting to a reproduced output, and allows the display unit 20 to display that format error has occured.

Namely, in the reproducing system of this digital tape-recorder, an approach is employed to judge, by the system controller 16, a reproducible recording format based on format ID information and compatibility ID information reproduced along with a digital audio signal from the recorded magnetic tape 11, to implement, by the decoder 15, decode processing in accordance with a reproduction format of the highest grade, and to reproduce the digital audio signal.

It is to be noted that system controller 4, operation input unit 9, and display unit 10, etc. in the recording system may double as system controller 16, operation input unit 19, and display unit 20, etc. in the reproducing system, respectively.

In the digital tape-recorder to which this invention is applied, since format ID information indicating a recording format of a digital audio signal recorded and reproduced through the magnetic tape, and compatibility ID information indicating compatibility of that recording format relative to other recording formats are recorded onto the magnetic tape 8 along with a digital audio signal in the recording system, it is possible to ensure so called an upper compatibility by the format ID information with respect to other recording formats, and to allow the compatibility ID information to ensure downward compatibility. Namely, in the reproducing system of the digital tape-recorder, with respect to the recorded magnetic tape 11, in the case of a later-developed model, it is possible to carry out reproducing processing where so called an upper compatibility is ensured on the basis of the format ID information with respect to existing recording formats, and in the case of a former-developed model, it is possible to carry out reproducing processing where downward compatibility is ensured on the basis of the compatibility ID information with respect to a new recording format.

In addition, an approach is employed in the recording system to record the compatibility ID information in order of priority of compatibility with respect to other plural recording formats, thereby making it possible to reproduce, in the reproducing system, a digital audio signal in accordance with a reproduction format of the highest grade of a plurality of recording formats available for the reproducing system.

As is clear from the foregoing description, in the information transmitting apparatus adapted for transmitting data on an information transmission line where a plurality of formats exist, an approach is employed to obtain, by ID information generating means, format ID information indicating a format of transmit data and compatibility ID information indicating compatibility of that format relative to other formats, and to add the format ID information and the compatibility ID information to that data by using the ID information adding means to transmit the transmit data along with the format ID information and the compatibility ID information added thereto. Accordingly, it is possible to ensure upper compatibility by the format ID information in later-developed models, and to ensure downward compatibility by the compatibility ID information with respect to existing other formats.

Moreover, in accordance with the information transmitting apparatus, the ID information generating means generates a plurality of compatibility ID information which are compatible with the ID information of transmit data. In addition, the ID information generating means generates the plural compatibility ID information from high grade version to low grade version in order. Thus, it is possible to carry out a reproducing processing in accordance with a reproducible format most suitable, e.g., of the highest grade in data reproducing apparatus of the former-developed model.

Further, the data reproducing apparatus receives transmit data, format ID information indicating a format of the transmit data, and a plurality of compatibility ID information indicating compatibility of the format relative to other formats which are transmitted through an information transmission line where a plurality of formats exist, thus to reproduce the transmit data in accordance with one of the compatibility ID information. Thus, reproducing processing where so called an upper compatibility is ensured can be implemented to existing formats on the basis of the format ID information in the case of an later-developed model, and reproducing processing where downward compatibility is ensured can be implemented to a new format on the basis of the compatible ID information in the case of a former-developed model. In addition, one of the compatibility ID information is determined as the highest grade format among the plural compatibility ID information transmitted through the information transmission line. Thus, it is possible to carry out a reproducing processing in accordance with a reproducible format of the highest grade of formats indicated by format information and compatibility information along with the transmit data.

As described above, in accordance with this invention, in an information transmission line adapted to transmit data in one way such as recording media or broadcasting media, it is possible to ensure developing property of an up-grade format having compatibility to exhibit not only so called an upper compatibility but also a lower compatibility with respect to existing equipments.

I claim:

1. A data preprocessing apparatus for preprocessing data to be recorded into tracks of a magnetic tape in one of a plurality of data formats including a basic format and at least one upgrade, comprising:

a system controller including format assignment means for assigning a first format to said data to be recorded from among said plurality of data formats, ID information generating means for generating format ID information indicating said first format and plural compatibility ID information indicating compatibility of said first format to other formats of said plurality of data formats each of said plural compatibility ID information including a mode ID information and a version ID information;

ID information adding means for adding control data including said format ID information and said plural compatibility ID information including said respective mode ID information and said respective version ID information to said data of said first format, wherein said ID information adding means adds said plural compatibility ID information in order of priority of compatibility of said first format to each of the remainder of said plurality of data formats; and recording means for recording said data of said first format and control data including said format ID information and said plural compatibility ID information including said respective mode ID information and said respective version ID information into tracks of said magnetic tape, said format ID information enabling a first reproducing device configured for processing data of a second later- or concurrently-developed format which is reproducing said data of said first format recorded into said tracks of said magnetic tape to recognize upward compatibility of said data of said first format with said second format and therefore to process said data according to said first format, and said plural compatibility ID information including said respective mode ID information and said respective version ID information enabling a second reproducing device configured for processing data of a third earlier-developed format which is reproducing said data of said first format recorded into said tracks of said magnetic tape to determine downward compatibility of said data of said first format with said third format and, if said first format is compatible with said third format, to process said data according to said third format.

2. A data preprocessing apparatus as set forth in claim 1, wherein said ID information generating means generates said plural compatibility ID information in priority from a most advanced version to a most basic version.

3. A data preprocessing, recording, and reproducing apparatus for preprocessing data to be recorded and recording the preprocessed data into tracks of a first magnetic tape in one of a plurality of data formats including a basic format and at least one upgrade, and for reproducing recorded data recorded on a second magnetic tape in one or another one of said plurality of formats, said apparatus comprising:

a system controller including format assignment means for assigning a first format to said data to be recorded from among said plurality of data formats, ID information generating means for generating both format ID information indicating said first format and plural compatibility ID information indicating compatibility of said first format to other formats of said plurality of data formats, each of said plural compatibility ID information including a mode ID information and a version ID information;

ID information adding means for adding control data including said format ID information and said plural compatibility ID information including said respective mode ID information and said respective version ID information to said data of said first format, wherein said ID information adding means adds said plural compatibility ID information in order of priority of compatibility of said first format to each of the remainder of said plurality of data formats;

recording means for recording said data of said first format combined with control data including said format ID information and said plural compatibility ID information including said respective mode ID information and said respective version ID information, said format ID information enabling a first device configured for processing data of a second later- or concurrently-developed format which is reproducing said data of said first format recorded into said tracks of said first magnetic tape to recognize upward compatibility of said data of said first format with said second format and therefore to process said data according to said first format, and said plural compatibility ID information including said respective mode ID information and said respective version ID information enabling a second device configured for processing data of a third earlier-developed format which is reproducing said data of said first format recorded into said tracks of said magnetic tape to determine downward compatibility of said data of said first format with said third format and, if said first format is compatible with said third format, to process said data according to said third format; and reproducing means for reproducing data of at least the first format recorded into tracks of said second magnetic tape in accordance with control data including format ID information or one of plural compatibility ID information also recorded into tracks of said second magnetic tape.

4. A data reproducing apparatus for reproducing data recorded into tracks of a magnetic tape along with control data also recorded on said magnetic tape which includes format ID information indicating a first format of said recorded data and a plurality of compatibility ID information including respective mode ID information and respective version ID information which indicates compatibility of said first format to a plurality of other formats including a basic format and at least one upgrade, said compatibility ID information being recorded in order of priority of compatibility of said first format to each of said plurality of other formats, said apparatus comprising:

data separation circuitry and a system controller including:

a) means for separating said control data including said format ID information and said plurality of compatibility ID information including said respective mode ID information and said respective version ID information from said recorded data; and b) means for assigning a reproduction format on the basis of said separated compatibility ID information recorded in order of priority of compatibility of said first format to each of said plurality of other formats, said first format being assigned as said reproduction format if said first format is one of at least one format which is available to said data reproducing apparatus, else another one of said at least one format being assigned as said reproduction format if said first format is determined to be compatible to said another one of said at least one format in accordance with one of said separated compatibility ID information including said respective mode ID information and said respective version ID information; and reproducing means for reproducing said recorded data in said assigned format.

* * * * *